(12) United States Patent
Prudhomme et al.

(10) Patent No.: US 11,122,805 B2
(45) Date of Patent: Sep. 21, 2021

(54) HERBICIDAL COMBINATION FORMULATIONS AND METHODS

(71) Applicant: Sipcam Agro USA, Inc., Durham, NC (US)

(72) Inventors: Michael Prudhomme, Natchez, LA (US); Samuel Joseph Wineinger, Kansas City, MO (US)

(73) Assignee: Sipcam Agro USA, Inc., Durham, NC (US)

( * ) Notice: Subject to any disclaimer, the term of this patent is extended or adjusted under 35 U.S.C. 154(b) by 34 days.

(21) Appl. No.: 16/796,856

(22) Filed: Feb. 20, 2020

(65) Prior Publication Data

US 2020/0267979 A1 Aug. 27, 2020

Related U.S. Application Data

(60) Provisional application No. 62/809,486, filed on Feb. 22, 2019.

(51) Int. Cl.
| | |
|---|---|
| *A01N 43/42* | (2006.01) |
| *A01N 43/56* | (2006.01) |
| *A01N 41/02* | (2006.01) |
| *A01N 47/36* | (2006.01) |
| *A01N 41/10* | (2006.01) |

(52) U.S. Cl.
CPC ............ *A01N 43/42* (2013.01); *A01N 41/02* (2013.01); *A01N 43/56* (2013.01)

(58) Field of Classification Search
CPC ........ A01N 43/42; A01N 43/56; A01N 41/02; A01N 47/36; A01N 41/10
See application file for complete search history.

(56) References Cited

U.S. PATENT DOCUMENTS

2006/0196115 A1* 9/2006 Threewitt .......... A01N 2300/00
47/58.1 R

* cited by examiner

*Primary Examiner* — Trevor Love
(74) *Attorney, Agent, or Firm* — Wiley Rein LLP

(57) ABSTRACT

The present embodiments relates to method and an herbicide combination for controlling weed growth in turfgrass while reducing or suppressing phytotoxicity or bleaching, which include contacting the turfgrass with an herbicidally effective amount of (a) the herbicide combination of mesotrione and quinclorac, (b) at least one agronomically acceptable excipient; and (c) optionally, a third herbicide; wherein the quinclorac in the formulation is present in an amount effective to reduce or suppress the phytotoxic or bleaching effect of mesotrione, as compared with mesotrione alone. The present embodiments also provide a method and combination formulation of controlling weed growth in turfgrass while reducing bleaching using a three-component formulation as described herein.

11 Claims, 2 Drawing Sheets

HERBICIDAL COMBINATION FORMULATIONS AND METHODS

RELATED APPLICATIONS

This Application claims the priority benefit of U.S. Provisional Application No. 62/809,486, filed Feb. 22, 2019, which is incorporated fully herein by reference for all purposes.

FIELD

The present embodiments relate to the use of herbicidal combination formulations and methods that can reduce, suppress, or prevent the bleaching effect of mesotrione, and thereby improve herbicidal control of one or more weeds in turfgrass.

BACKGROUND

Maintaining a high quality and healthy lawn or turf is of continued importance to the sporting industries such as golf, baseball and football, as well as to residential or institutional lawns, public green areas, sod farms, etc. Excess weed growth can decrease turf quality due to the color and texture contrast between the turfgrass plants and the weeds. Furthermore, weeds if overgrown can compete with the turfgrass plants for water and nutrient availability, which may lead to undesirable turfgrass cover.

For the purpose of controlling weeds in turfgrass, current herbicides typically provide selective action against annual or perennial weeds, optimally without substantial injury to the lawn or turf, and are applied to the soil surface prior to the germination or emergence of the weeds (pre-emergence or preventive treatment) or after the germination and emergence of the weeds from the soil (post-emergence or curative treatment). For example, selective herbicides such as p-hydroxyphenylpyruvate deoxygenase-inhibiting herbicides (HPPD inhibitors) are used to control weed growth, but can also cause undesirable or significant injury, e.g., phytotoxicity, to turfgrass. Common phytotoxic effects may include bleaching, stunting, and reduced turfgrass quality. If turfgrass sustains minor injury from herbicide treatment, it may recover in time. In some settings, however, such as golf courses where high quality turfgrass is crucial, even low-level bleaching for a short time is undesirable. Additionally, phytotoxicity can be severe if herbicides are applied to certain warm and cool season turfgrass species. Accordingly, there exists a need to further reduce the bleaching exhibited by turfgrass following application of selective herbicides, such as HPPD inhibitors, so that effective weed control can be achieved without causing an unacceptable decrease in turfgrass quality.

SUMMARY OF THE INVENTION

The embodiments described herein provide methods and herbicidal combinations of controlling weed growth and reducing bleaching or phytotoxiciy in turfgrass. One aspect of the present embodiments provides a method for controlling at least one weed in turfgrass while reducing or suppressing bleaching, comprising contacting said turfgrass with a herbicidally effective amount of an herbicidal combination consisting of mesotrione and quinclorac as active ingredients, (b) at least one agronomically acceptable excipient, and (c) optionally, a third herbicide; wherein the quinclorac in said herbicidal combination is present in an amount effective to reduce or suppress the phytotoxic or bleaching effect of mesotrione. In at least one embodiment, the herbicidal combination exhibits reduced bleaching of the turfgrass as compared with the application of mesotrione alone.

In at least one embodiment, the third herbicide is halosulfuron.

Examples of turfgrass that can be treated with the herbicidal combination according to the present embodiments include tall or fine fescue grass, buffalograss, perennial ryegrass, bermudagrass, and Kentucky bluegrass.

Examples weeds that may be controlled according to the present embodiments, include large and smooth crab grass, annual bluegrass, green foxtail, barnyard grass, bentgrass, carpetweed, chickweed, purple nutsedge, and yellow nutsedge.

In another embodiment, the herbicidal combination is capable of controlling weed growth post-emergence. In yet another embodiment, the herbicidal combination is capable of controlling weed growth pre-emergence and post-emergence. In at least one embodiment, the formulation provides synergistic control of at least one weed.

In at least one embodiment, the herbicidal combination of mesotrione and quinclorac may be applied in an amount of 3 oz/acre and 0.15 lb/acre, respectively, or 4 oz/acre and 1 lb/acre, respectively. In yet another embodiment, mesotrione is applied at about 3 oz/acre to about 4 oz/acre, and quinclorac is applied at about 0.15 lb/acre to about 1 lb/acre or at about 0.15 lb/acre to about 1.2 lb/acre. In at least one embodiment, mesotrione is applied at about 3 oz/acre to about 4.6 oz/acre and quinclorac is applied at about 0.65 lb/acre to about 1 lb/acre or at about 0.65 lb/acre to about 1.2 lb/acre.

In at least embodiment, the combination further includes a third herbicide, such as halosulfuron. In such embodiments, mesotrione may be applied at about 3 oz/acre to about 3.5 oz/acre, quinclorac may be applied at about 0.85 lb/acre to about 1 lb/acre or at about 0.85 lb/acre to about 1.2 lb/acre, and halosulfuron may be applied at about 01.1 oz/acre to about 1.3 oz/acre.

In at least embodiment, the herbicidal combination comprises at least one agronomically acceptable excipient such as an adjuvant, a surfactant(s), a crop oil concentrate, a flow agent or an anti-caking agent, an emulsifier, an anti-freeze agent, an anti-foaming agent, a dispersant, a biocide, or a thickener.

In one aspect of the present embodiments, the herbicidal combination is applied in a spray volume of at least about 10 gallons/acre to about 40 gallons/acre.

In another aspect of the present embodiments, the herbicidal combination may be formulated in form of dry flowable (DF), water-soluble concentrates (SL), emulsifiable concentrates (EC), emulsions (EW), micro-emulsions (ME), suspension concentrates (SC), oil-based suspension concentrates (OD), flowable suspensions (FS), water-dispersible granules (WG), water-soluble granules (SG), wettable powders (WP), water-soluble powders (SP), granules (GR), encapsulated granules (CG), fine granules (FG), macrogranules (GG), aqueous suspo-emulsions (SE), capsule suspensions (CS), microgranules (MG), or a combination of these. In at least one embodiment, the herbidical combination is a tank mixture or a ready mixture.

Another aspect of the present embodiments provides an herbicidal combination for controlling at least one weed in turfgrass while reducing or suppressing bleaching, consisting of: (a) an herbicidally effective amount of mesotrione and quinclorac as active ingredients, (b) at least one agronomically acceptable excipient, and (c) optionally, a third herbicide; wherein quinclorac in the herbicidal combination is present in an amount effective to reduce or suppress the phytotoxic or bleaching effect of mesotrione as compared with the application of mesotrione alone. In one embodiment, the third herbicide is halosulfuron. In at least one embodiment, the combination is a comprises a commercial formulation. In at least one embodiment, the combination is prepared on site or shortly before application to said turfgrass.

In yet another aspect of the present embodiments provides method of controlling at least one weed in turfgrass while reducing or suppressing bleaching, which comprises contacting the turfgrass with a herbicidally effective amount of (a) a combination of mesotrione, halosulfuron, and quinclorac, as active ingredients, and (b) at least one agronomically acceptable excipient, wherein quinclorac in the herbicidal combination is present in an amount effective to reduce or suppress the phytotoxic or bleaching effect of mesotrione on the turfgrass, as compared with the application of mesotrione alone.

In a particular embodiment, the active ingredients present in the herbicidal combination are mesotrione 4 L, quinclorac 75 DF, and 60% DF halosulfuron.

In another embodiment, mesotrione is applied at about 3 oz/acre to about 3.5 oz/acre, quinclorac is applied at about 0.85 lb/acre to about 1 lb/acre or at about 0.85 lb/acre to about 1.2 lb/acre, and halosulfuron is applied at about 1.1 oz/acre to about 1.3 oz/acre.

In at least one embodiment, the at least one agronomically acceptable excipient in the herbicidal combination may be an adjuvant, a surfactant(s), a crop oil concentrate, a flow agent or an anti-caking agent, an emulsifier, an anti-freeze agent, an anti-foaming agent, a dispersant, a biocide, or a thickener.

This and other aspects of the present embodiments will become more readily apparent through the following descriptions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is a photo of an example turfgrass following selective herbicidal treatment, taken 5-7 days after the beginning of treatment. The left half of the photo shows turfgrass treated with a combination of mesotrione and sulfentrazone; the right half of the photo shows turfgrass treated with a combination of mesotrione and quinclorac.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

All patents and other publications identified are incorporated herein by reference for the purpose of describing and disclosing, for example, the methodologies described in such publications that might be used in connection with the present invention, but are not to provide definitions of terms inconsistent with those presented herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on information available to the applicants and do not constitute any admission as to the correctness of the dates or contents of these documents.

As used herein and in the claims, the singular forms "a," "an," and "the" include the plural reference unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers. The term "or" is inclusive unless modified, for example, by "either." Thus, unless context indicates otherwise, the word "or" means any one member of a particular list and also includes any combination of members of that list. As used herein, all numerical values relating to amounts, weight percentages and the like are defined as "about" or "approximately" each particular value, namely, plus or minus 10% (±10%), unless context clarifies otherwise. For example, the phrase "at least 5%" is to be understood as "at least 4.5% to 5.5%." In general, reference to % means % by weight (wt %).

Many types of herbicides have been reported in the literature and used commercially. In some instances, herbicidal active agents have been found more effective when used as a combination than when applied individually. In some instances, the efficacy of the combination is additive. In some instances, the efficacy of the combination is synergistic.

It has been surprisingly found that combining quinclorac and mesotrione greatly reduced the bleaching effect of mesotrione in turfgrass. In particular, the herbicidal combination of quinclorac and mesotrione performed better than the mixture of mesotrione with another herbicide.

Definitions

The terms "turfgrass, "lawn" or "turf" are used in the following for describing more or less the same types of plant species which can be used for generating a high-quality lawn or turf. Therefore, when using the term "lawn" only, it defines plant species which can be used for turf as well and vice versa. The term "lawn" or "turf" describes all uses of well-maintained grass in established lawns, ornamental turfgrass, sports turf like football or soccer places, landscape situations, parks, commercial, home and gardens or all other situations were grasses are grown for achieving a well-maintained ground cover that is functional for all types of sport activities or for aesthetic purposes.

As used herein, "herbicide" and "herbicidal active ingredient" refers to an active ingredient which when applied in an appropriate amount, kills, controls, or otherwise adversely modifies the growth and development of vegetation, particularly undesirable vegetation, such as weeds, volunteer crops, and other plant species that differ from the plant species intended for growth.

As used herein, a "herbicidally effective amount" refers to an amount of an herbicidal active ingredient that causes a "herbicidal effect," i.e., an adversely modifying effect including, for instance, a deviation from natural growth or development, killing, necrosis, stunting, regulation, desiccation, controlling, combatting, or retardation. The term "herbicidally effective amount" may also indicate the quantity of HPPD inhibitor that is capable of producing a controlling or modifying effect on the growth of plants. Controlling or modifying effects include all deviation from natural development, for example: killing, retardation, leaf burn, albinism, dwarfing, and the like. The "herbicidally effective amount" will vary depending on the formulation concentration, the type of plants(s) being treated, the severity of the weed infestation, the result desired, and the life stage of the weeds during treatment, among other factors. Thus, it is not always possible to specify an exact "herbicidally effective amount." An appropriate "herbicidally effective amount" in any individual case may be determined by one of ordinary skill in the art.

The term "synergistically effective amount" indicates the quantity of the combination of herbicidal active ingredients capable of producing a controlling or modifying effect on the growth of plants, where said effect is greater than the sum of the effects obtained by applying each of the herbicidal active ingredients individually.

As used herein, applying an herbicide or herbicidal combination formulation means delivering it directly to the targeted undesirable vegetation or to the locus thereof or to the area where control of undesired vegetation is desired. Methods of application include, but are not limited to preemergence, postemergence, foliar, soil, and in-water applications. Described herein are methods of controlling undesirable vegetation by applying certain herbicide combination preparations or formulations.

As used herein, plants and vegetation include, can include, for instance, dormant seeds, germinant seeds, emerging seedlings, plants emerging from vegetative propagules, immature vegetation, and established vegetation.

In general, turfgrasses include both cool-season turfgrasses and warm-season turfgrasses. Example cool season turfgrasses may include Bluegrasses, such as Kentucky Bluegrass, Rough Bluegrass, Canada Bluegrass and Annual Bluegrass; Bentgrasses, such as Creeping Bentgrass, Colonial Bentgrass, Velvet Bentgrass and Redtop; Fescues, such as Creeping Red Fescue, Chewings Fescue, Sheep Fescue, Hard Fescue, Tall Fescue, and Meadow Fescue; Ryegrasses, such as Perennial Ryegrass and Annual (Italian) Ryegrass; Wheatgrasses, such as Fairway Wheatgrass and Western Wheatgrass; Smooth Brome; and Timothy. Example warm season turfgrasses include Bermudagrasses, Zoysiagrasses, St. Augustinegrass, Centipedegrass, Carpetgrass, Bahiagrass, Kikuyugrass, Buffalograss, Centipedegrass, and Seashore paspalum.

Application of the herbicidal combination can be done before, during, or after, the emergence of the undesirable vegetation (e.g., weed or weeds).

As used herein, the term "weed" refers to undesirable vegetation, undesirable species, undesirable plants, harmful plants, undesirable weeds, harmful weeds, and the like.

The phrase "application to the turfgrass" includes application directly to the turfgrass itself, application to the locus of the turfgrass, application to weeds growing in the turfgrass, and application to turfgrass seeds, and application to bare ground on which turfgrass seeds have been or will be sown. The "locus" is intended to include soil, seeds, and seedlings, as well as established vegetation.

The phrase "without causing significant injury to the turfgrass" means without resulting in unacceptable levels of phytotoxicity, bleaching, or stunting of the turfgrass, or an unacceptable reduction in turfgrass color and quality.

"Quality" of turfgrass generally refers to both visual quality of turfgrass and functional quality of turfgrass. "Visual quality" of turfgrass generally relates to the visual appearance, such as density (the number of aerial shoots per unit area), uniformity (for example uniformity of texture, such as width of the leaf blades: fine-textured as in red fescue, or coarse-textured as in tall fescue), color or smoothness (affecting, for example, the playability of a golf course). "Functional quality" of turfgrass generally relates to, for example, rigidity (resistance of the turfgrass leaves to compression and is related to the wear resistance of a turf), elasticity (tendency of the turfgrass leaves to spring back once a compressing force is removed), resiliency (capacity of a turf to absorb a shock without altering its surface characteristics), ball roll (average distance a ball travels upon being released to a turf surface), yield (measure of clippings removed with mowing), verdure (measure of amount of aerial shoots remaining after mowing), rooting (amount of root growth evident at any one time during the growing season), and recuperative capacity (capacity of turfgrasses to recover from damage caused by disease organisms, insects, traffic and the like). The definitions of visual and functional qualities are not mutually exclusive. Turfgrass color and quality may be assessed, for example, by an industry standard based on a scale of 1 to 9, with 9 indicating dark green color of turf and the highest quality. In some instances, a turfgrass quality of 6 or less is deemed unacceptable by industry standards.

An improvement in the quality of turfgrass can relate to one or more of the visual or functional quality characteristics described above or to any combination of these quality characteristics. "Improvement" generally refers to a measurable or noticeable increase in a given turfgrass quality characteristic when compared to the same turfgrass quality characteristic produced under the same conditions, but without the application of the subject method. An improvement in the quality characteristics of turfgrass is, for example, a greener or more pleasant, leaf color of the turf.

Herbicides and Herbicidal Combination Formulations

Mesotrione is a synthetic triketone herbicide HPPD-inhibiting herbicide classified as a Group 27 herbicide, and is chemically known as 2-[4-(methylsulfonyl)-2-nitrobenzoyl]-1,3-cyclohexanedione. It disrupts carotenoid synthesis in susceptible weeds by inhibiting 4-hydroxyphenylpyruvate deoxygenase, an essential enzyme in the catabolism of tyrosine, anabolism of plastoquinones and tocopherols, and subsequent carotenoid biosynthesis. Carotenoids protect the chlorophyll from excess light energy. Without carotenoids, light energy destroys chlorophyll causing new plant growth to turn white and disrupting cell membrane that leads to necrosis and death of susceptible plants. Foliar bleaching or whitening can persist for approximately two weeks after mesotrione treatments, followed by necrosis in susceptible species. See Goddard, M. J. et al. (2010) Wees Sci. 58:67-72. Mesotrione controls a wide spectrum of broadleaf weeds at a wide range of growth stages when applied post-emergence on turfgrass. Mesotrione application can, however, result bleaching of turfgrass and a measurable decrease in turf quality.

Quinclorac is an auxin agonist and a Group 4 herbicide, and is chemically known as 3,7-dichloro-8-quinolinecarboxilic acid. Quinclorac may be applied post-emergence to residential and non-residential turfgrasses for the control of many broadleaf and grass weeds. Quinclorac is absorbed by foliage and roots and translocated throughout the plant. The control symptoms exhibited by broadleaf weeds include leaf and stem curl or twisting and chlorosis. Susceptible grasses demonstrate stunting, chlorosis, and gradual reddening followed by necrosis and death.

Halosulfuron-methyl is a member of the sulfonylurea herbicides (Group 2 herbicide) and an acetolactate synthase inhibitor, and is chemically known as methyl-3-chloro-5-(4,6-dimethoxypyrimidin-2-ylcatbamoylsulfamoyl)-1-mehtylpyrazole-4-carboxylate. Halosulfuron-methyl's acetolactate synthase activity blocks biosynthesis of the branched-chain amino acids valine, leucine, and isoleucine. This inhibition leads to the rapid cessation of plant cell division and growth. Halosulfuron-methyl is known to provide post-emergent control of broad-leaf weeds and sedges.

Sulfentrazone, is an aryl triazolinone herbicide (Group 14 herbicide) and a protoporphyrinogen oxidase (PPO)-inhibitor, and is chemically known as N-{2,4-Dichloro-5-[4-(difluoromethyl)-3-methyl-5-oxo-4,5-dihydro-1H-1,2,4-triazol-1-yl]phenyl}methane-sulfonamide. Sulfentrazone is used for pre-emergent and post-emergent control of certain broadleaf weeds, grasses, and sedges. Sulfentrazone's PPO inhibition disrupts cellular membranes and inhibits photosynthesis. Sulfentrazone is received in the plants through the roots of the plants. As the plants emerge from the soil, they die after exposure to light. Sulfentrazone also works on foliar contact, causing rapid desiccation.

In at least one embodiment, the control of at least one weed in turfgrass while reducing or suppressing bleaching may be achieved by contacting the turfgrass with an herbicidally effective amount of a herbicidal combination consisting of (a) mesotrione and quinclorac as active ingredients, (b) at least one agronomically acceptable excipient, and (c) optionally, a third herbicide; wherein quinclorac is present in an amount effective to reduce or suppress the phytotoxic or bleaching effect of mesotrione on the turfgrass. In at least one embodiment, the herbicidal combination exhibits reduced or suppressed bleaching as compared with the application of mesotrione alone. In some embodiments, the third herbicide is halosulfuron.

In one aspect of the present embodiments, mesotrione is applied in an amount of about 3 oz/acre to about 4.6 oz/acre or about 3 oz/acre to about 4 oz/acre, and quinclorac is applied at about 0.65 lb/acre to about 1 lb/acre, about 0.65 lb/acre to about 1.2 lb/acre, about 0.15 lb/acre to about 1 lb/acre or about 0.15 lb/acre to about 1.2 lb/acre. In another embodiment, the combination of mesotrione and quinclorac is applied, for example, at 3 oz/acre and 0.65 lb/acre, respectively, or 4.6 oz/acre and 1 lb/acre, respectively.

In at least one embodiment, the herbicidal combination is capable of controlling weed growth post-emergence. In at least one embodiment, the herbicidal combination is capable of controlling weed growth pre-emergence and post-emergence. In at least one embodiment, the herbicidal combination may provide for synergistic control of at least one weed.

Another aspect of the present embodiments provides an herbicidal combination for controlling at least one weed in turfgrass, while reducing bleaching of turfgrass. The herbicidal combination consists of an herbicidally effective amount of mesotrione and quinclorac as active ingredients, (b) at least one agronomically acceptable excipient, and (c) a third herbicide; wherein quinclorac in the formulation is present in an amount effective to reduce or suppress the phytotoxic or bleaching effect of mesotrione on the turfgrass, as compared with the application of mesotrione alone.

In yet another aspect of the present embodiments, a method of controlling at least one weed in turfgrass while reducing or suppressing bleaching, comprising contacting the turfgrass with a "3-way" herbicidal combination of mesotrione, quinclorac, and halosulfuron as active ingredients, and at least one agronomically acceptable excipient; wherein quinclorac in the formulation is present in an amount effective to reduce or suppress the phytotoxic or bleaching effect of mesotrione on the turfgrass, as compared with the application of mesotrione alone.

In one embodiment, the active ingredients present in the combination are as follows: mesotrione 4 L, 75% DF quinclorac, and 60% DF halosulfuron. In another embodiment, mesotrione is applied at about 3 oz/acre to about 4 oz/acre, quinclorac is applied at about 0.85 lb/acre to about 1 lb/acre or about 0.85 lb/acre to about 1.2 lb/acre, and halosulfuron is applied at about 1.1 oz/acre to about 1.3 oz/acre.

In at least one embodiment, the herbicidal combination of mesotrione, quinclorac, and halosulfuron exhibits reduced turfgrass bleaching as compared to the application of mesotrione alone. In one embodiment, the herbicidal combination of mesotrione, quinclorac, and halosulfuron is applied as a ready mixture (pre-made formulation) or a tank mixture. In one embodiment, the herbicidal combination of mesotrione, quinclorac, and halosulfuron and is capable of controlling weed growth pre-emergence and post-emergence. In one embodiment, the herbicidal combination of mesotrione, quinclorac, and halosulfuron may provide for synergistic control of at least one weed, compared with application of mesotrione, quinclorac, and halosulfuron alone.

Exemplary weeds which may be controlled by the present embodiments may include, e.g., monocotyledonous weeds such as barnyard grass, large and smooth crabgrass, goosegrass, bentgrass, yellow foxtail, yellow nutsedge, windmillgrass and nimblewill; and dicotyledonous weeds such as dandelion, white and red clover, chickweed, henbit, corn speedwell, oxalis, buckhorn and broadleaf plantain, dollar weed, Florida pusley, lambsquarters, knotweed, ragweed, wild violets, pigweed, black medic, hedge weed, buttercup, carpetweed, curly dock, Florida betony, galinsoga, ground ivy, healall, lawn burweed, marestail, common purslane, shepherd's purse, sowthistle, swinecress, canada thistle, verbena and wild carrot.

The benefits of the present embodiments may be seen most when the herbicidal combination is applied to kill weeds in established turfgrass.

Warm season turfgrasses are typically more susceptible to injury by application of HPPD inhibitors such as mesotrione than cool season turfgrasses. In at least one embodiment, the herbicidal combination is applied to warm season turfgrass.

Application sites may include airports, fallow areas, landscaped areas, landscaped areas with established woody ornamentals, public recreation areas, roadsides, school grounds, golf courses, parks, cemeteries, sod or turf seed farms, athletic fields, commercial and residential turfgrass, fairgrounds, race tracks, tennis courts, campgrounds, utility facilities, and rights-of-ways.

The herbicidal combinations of the present embodiments can be applied in conventional manner by using techniques familiar to the skilled person. Suitable techniques include spraying, atomizing, dusting, spreading, or watering. The type of application depends on the intended purpose in a well-known manner; in any case, they should ensure the finest possible distribution of the active ingredients according to the invention.

The herbicidal combinations of the present embodiments may be applied pre- or post-emergence, i.e., before, during, or after emergence of the undesirable plants. Applications may be applied by spraying at an application amount of, for example, about 10 gallons/acre to about 40 gallons/acre, such as, for example, 11 gallons/acre. The herbicidal combination should not be applied in excess of the maximum rate approved by regulatory authorities.

In one aspect of the present embodiments, the herbicidal combinations can be prepared in form of water-soluble concentrates (SL), emulsifiable concentrates (EC), emulsions (EW), micro-emulsions (ME), suspension concentrates (SC), oil-based suspension concentrates (OD), flowable suspensions (FS), water-dispersible granules (WG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and microgranules (MG). Preferred formulations are water-soluble concentrates (SL), water-dispersible granules (WG), water-soluble granules (SG), or a combination of these.

The herbicidal combinations of the present embodiments include, besides the active ingredients, at least one agronomically acceptable excipient. Exemplary agronomically acceptable excipients include, but are not limited to, antifreeze agents, antifoam agents, compatibilizing agents, sequestering agents, anti-caking agents, neutralizing agents and buffers, corrosion inhibitors, colorants, odorants, penetration aids, wetting agents, spreading agents, dispersing agents, thickening agents, freeze point depressants, antimicrobial agents, crop oil or vegetable oil concentrate (e.g, methylated seed oil (MSO)), safeners, adhesives (for instance, for use in seed formulations), surfactants, protective colloids, emulsifiers, tackifiers, and mixtures thereof. Such agronomically acceptable excipients are known in the art and are commercially available. Their use in the herbicidal combinations of the present embodiment will be apparent to the person skilled in the art.

The herbicidal combinations described herein may include one or more surfactants, for example, non-ionic, cationic or anionic in nature, or surfactant mixtures that have good emulsifying, dispersing and wetting properties, depending upon the active compounds being formulated. Suitable surfactants are known in the art and are commercially available. Another exemplary agriculturally acceptable excipient may also include at least one non-ionic surfactant (NIS) at a concentration of about 0.25% v/v or at least one crop oil concentrate (e.g., mineral oil) at a concentration of about 1% v/v. Addition of non-ionic surfactants (NIS) can optimize the performance of the herbicide formulation and reduce the number of products that the end user has to add to the mix. An exemplary surfactant is methylated seed oil (MSO) concentrate with an application rate of about 1.5 pints/acre (pts per acre).

Exemplary agronomically acceptable excipients may include one flow agent or anti-caking agent (e.g., Hisil® 233), emulsifier (e.g., Ethox P-104), anti-freeze agent (e.g. polyethylene glycol), anti-foaming agent (e.g., anti-foam FG-10), dispersant (e.g., Tersperse® 2020), biocide (e.g., Proxel® GXL), or thickener (e.g., Kelzan®).

The herbicidal combination of the present embodiments may be prepared as suspension concentrates and derivatives thereof. The active ingredients may be incorporated into a suspension concentrate. The term "suspension concentrate" as used herein, means a composition also sometimes referred to as an "aqueous flowable" or a "water-based flowable" composition, which compositions are known in the herbicide art and include or consist of particles of a generally insoluble solid active herbicide compound in suspension (preferably concentrated suspension) in water. The suspension concentrates described herein can be produced with particles of the active ingredients by suspending and preferably dispersing the particles in water with the assistance of other ingredients such as conventional dispersants, surfactants (wetting agents), and other optional ingredients. The active ingredients should be in the form of particles that exhibit physical characteristics such as size, shape, surface features, etc., that will allow the active ingredient particles to be suspended in water as described. The particle size range can vary depending on factors such as the other ingredients used to prepare the suspension concentrate and their respective amounts, but exemplary particles may be in the size range below about 10 microns, for example in the range from about 4 or 5 to about 7 or 8 microns.

A suspension concentrate typically includes water in a useful amount, such as an amount that, in combination with one or more other ingredients described herein (e.g., such as surfactant and/or dispersant) that allow suspension and dispersion of active ingredient particles. Relative amounts of water and the other ingredients used to prepare a suspension concentrate can be any amounts that produce a useful herbicide formulation in the form of a suspension concentrate. Relative amounts of different ingredients (water, active ingredients, surfactant, etc.) in any particular composition can depend on the intended application (including the plant to be controlled or the crop to be protected), the mode of application (e.g., field or aerial spraying or application from a hand-held spray applicator, or other technique), the method of any preparation from a suspension concentrate to an herbicide application composition, the amounts and identities of other ingredients added to the suspension concentrate, etc. Useful amounts of water in a suspension concentrate may be, for example, in the range from about 20% to about 60% (weight percent) water based on the total weight of the suspension concentrate, such as from about 30% to about 50% (weight percent) water in a suspension concentrate.

Wettable powders (sprayable powders) are products that are uniformly dispersible in water and which, besides the active ingredients and in addition to one or more diluents or excipients, typically comprise ionic or nonionic surfactants (wetting agents, dispersants), e.g., polyoxyethylated alkylphenols, polyethoxylated fatty alcohols or fatty amines, propylene oxide/ethylene oxide copolymers, alkanesulfonates or alkylbenzenesulfonates or alkylnaphthalenesulfonates, sodium lignosulfonate, sodium 2,2'-dinaphthyl-methane-6,6'-disulfonate, sodium dibutylnaphthalenesulfonate, or sodium oleoylmethyltauride.

Emulsifiable concentrates may be prepared by dissolving the active ingredients in an organic solvent or solvent mixture, e.g., butanol, cyclohexanone, dimethylformamide, acetophenone, xylene or else higher-boiling aromatics or hydrocarbons with addition of one or more ionic and/or nonionic surfactants (emulsifiers). Examples of emulsifiers which may be used are: calcium alkylarylsulfonates such as calcium dodecylbenzenesulfonate, or nonionic emulsifiers such as fatty acid polyglycol esters, alkylaryl polyglycol ethers, fatty alcohol polyglycol ethers, propylene oxide-ethylene oxide copolymers, alkyl polyethers, sorbitan fatty acid esters, polyoxyethylene sorbitan fatty acid esters or polyoxyethylene sorbitol esters.

Dustable powders may be obtained by grinding the active ingredients with finely distributed solid substances, for example talc, natural clays such as kaolin, bentonite and pyrophyllite, or diatomaceous earth.

Oil dispersions are oil-based suspensions of active ingredients, where oil is to be understood as meaning any organic liquid, for example vegetable oils, aromatic or aliphatic solvents, or fatty acid alkyl esters. They can be prepared, for example, by wet grinding by means of commercially available bead mills and, if appropriate, addition of further surfactants (wetting agents, dispersants) as have already been mentioned, for example, above in the case of the other formulation types. In addition to the suspended active compound or active compounds, other active compounds may also be present in the formulation in dissolved form.

Emulsions, for example oil-in-water emulsions (EW), can be prepared, for example, by means of stirrers, colloid mills or static mixers from mixtures of water and water-immiscible organic solvents and, if appropriate, further surfactants as have already been mentioned, for example, above in the case of the other formulation types. Here, the active ingredients are present in dissolved form.

Granules can be prepared either by spraying the active ingredients onto adsorptive, granulated inert material or by applying active compound concentrates to the surface of carriers such as sand, kaolinites, chalk or granulated inert material with the aid of binders, for example polyvinyl alcohol, sodium polyacrylate, or mineral oils. Suitable active ingredients can also be granulated in the manner customary for the preparation of fertilizer granules if desired as a mixture with fertilizers. Water-dispersible granules are produced generally by customary processes such as spray-drying, fluidized bed granulation, pan granulation, mixing with high-speed mixers and extrusion without solid inert material. The production of pan granules, fluidized bed granules, extruder granules, and spray granules are also known in the art. See, e.g., PROCESSES IN SPRAY-DRYING HANDBOOK (3rd ed., G. Goodwin Ltd., London, 1979); Browning, AGGLOMERATION, IN CHEMICAL & ENGINEERING, pages 147 (1967); PERRY'S CHEMICAL ENGINEER'S HANDBOOK, at 8-57 (5th ed., McGraw-Hill, New York 1973).

Details and protocols regarding the formulation of many herbicidal compositions and preparation of herbicide formulations are known in the art. See, e.g., Klingman, WEED CONTROL AS A SCIENCE, at 81-96 (John Wiley & Sons, Inc., New York, 1961); Freyer & Evans, WEED CONTROL HANDBOOK at 101-03 (5th ed., Blackwell Sci. Publ., Oxford, 1968).

The following examples are for illustrative purposes only. The examples are not intended as necessarily representative of the overall testing performed and are not intended to limit the invention in any way. As one skilled in the art is aware, in herbicidal testing, a significant number of factors that are not readily controllable can affect the results of individual tests and render them non-reproducible. For example, the results may vary depending on environmental factors, such as amount of sunlight and water, soil type, pH of the soil, temperature and humidity, among others. Also, the depth of planting, the application rate of individual and combined herbicides, the application rate of any antidote, and the ratio of the individual herbicides to one another and/or to an antidote as well as the nature of crops or weeds being tested can affect the results of the test. Results may vary from crop to crop within the crop varieties.

EXAMPLES

Example 1—Reduced Bleaching of an Herbicidal Combination as Applied to Bermudagrass A study was conducted to assess herbicidal combination for reduction of the bleaching effect of mesotrione during control of small or large crabgrass in Bermudagrass turfgrass.

A test plot was treated with a combination of selective herbicides and labeled as Treatment No. 1 to No. 4. See Table 1. After 5-7 days of treatment with a spray volume of 11 gal/acre, a photo was taken to provide a visual appearance of the effect of various treatments on Bermudagrass (FIG. 1).

Referring to FIG. 1, the mesotrione+quinclorac combinations (Treatment No. 1 and No. 2) were applied to the right side of the plot (right side of FIG. 1), and the mesotrione+sulfentrazone combinations (Treatment No. 3 and No. 4) were applied to the left side of the plot (left side of FIG. 1). The red flag in the middle of the plot serves as a divider for the four treatments. More bleaching occurred in the area treated with the mesotrione+sulfentrazone combination(s) compared with the area treated with the mesotrione+quinclorac combination(s). The different application rates evaluated (No. 1 vs. No. 2; No. 3 vs. No. 4) did not make an apparent difference in the level of bleaching or reduced bleaching in this experiment. Although quinclorac reduced or suppressed the bleaching effect of mesotrione at both low and high application rates, sulfentrazone did not reduce the bleaching effect of mesotrione when applied at either rate. Accordingly, combination with quinclorac reduced or suppressed the bleaching effects of mesotrione. The results of the various treatments are summarized in Table 1:

TABLE 1

Effect of selective herbicidal treatments on phytotoxicity of Bermudagrass

| Treatment No. | Active Ingredients | Application Rates | Visual Turfgrass Injury |
|---|---|---|---|
| 1 (low rate) | Mesotrione + Quinclorac | 3 oz/acre + 0.65 lb/acre | Reduced/Suppressed Bleaching |
| 2 (high rate) | Mesotrione + Quinclorac | 4.6 oz/acre + 1 lb/acre | Reduced/Suppressed Bleaching |
| 3 (low rate) | Mesotrione + Sulfentrazone | 3 oz/acre + 6 oz/acre | Severe Bleaching |
| 4 (high rate) | Mesotrione + Sulfentrazone | 4.6 oz/acre + 9.2 oz/acre | Severe Bleaching |

Example 2—Evaluation of a Three-Component Herbicidal Combination as Applied to Bermudagrass Another study was carried out to measure the quality of turfgrass (common Bermuda turf type 7 DAT) following application of a three-actives ("3-way") herbicidal combination comprising halosulfuron, mesotrione, and quinclorac. An exemplary formulation of three-way herbicidal combination is provided in Table 2.

TABLE 2

Three-Actives Combinations

| Formulation | Halosulfuron 60% DF | Mesotrione 4 L | Quinclorac 75% DF |
|---|---|---|---|
| | Application per acre of formulated product | | |
| SA1 | 1.1 oz | 3 oz | 0.85 lb |
| SA2 | 1.3 oz | 3.5 oz | 1.0 lb |
| SA2 (a.i. load @1.2 lb rate/acre) | 0.78 oz | 0.109 lb | 0.75 lb |

Figure 2A:
FIGS. 2A and 2B are photos of turfgrass quality after 7 days of treatment with either mesotrione alone (FIG. 2A) or a three-way herbicidal combination (FIG. 2B).
Figure 2B:

In carrying out the study, a test plot was treated with mesotrione alone or with a three-way herbicidal combination, respectively. After 7 days of treatments with a spray volume of an active load at 1.2 lb rate/acre, photos were taken to provide a visual appearance of the effects of these two treatments on Bermudagrass. See FIG. 2A and FIG. 2B. Referring to FIG. 2A and FIG. 2B, mesotrione alone was applied on one side of the test plot (FIG. 2A) and the three-way herbicidal combination was applied on the opposite side (FIG. 2B). Application of the three-way herbicidal combination resulted to a reduction or suppression of the bleaching effect of mesotrione on the Bermudagrass (FIG. 2B), as compared to the application of mesotrione alone (FIG. 2A).

The 3-way herbicidal combinations ("SA") were applied on common Bermudagrass as discussed herein and can also be applied on Kentucky bluegrass, perennial grass, tall fescue grass, and buffalograss. Commercial comparators include Sedgehammer® (halosulfuron-methyl 60% DF) (Gowan, Company, LLC), Q4® (5.69% quinclorac, 0.69% sulfentrazone, 12.02% 2,4-D, dimethylene salt, 1.38% Dicamba, dimethylamine salt, and 80.22% inert ingredients) (PBI Gordon Corp.). Targeted weeds included sedge, kyllinga, crabgrass and broadleaf weeds. Test plots were tested in at least replicates. Quality of turfgrass and weed control were evaluated before and after application of the test herbicidal combination. The herbicidal combinations were applied by surface spraying (volume 20 gal/acre, carrier was water) on standard test plots (10 ft×5 ft), replicated four times. Other parameters for evaluation included, e.g., reduction of bleaching in the three-way formulation versus mesotrione alone, weed control in turf types both pre- and post-emergence, whether crabgrass control is equal to or better than quinclorac alone, improved control at 2-4 tiller and sedge and kyllinga control, and speed of control of mixes versus, e.g., halosulfuron alone. Table 3 shows treatment parameters:

TABLE 3

Three-Way Formulations and Test Parameters

| Trt No | Treatment Name | Form Amount | Form Type | Rate | Rate Unit |
|---|---|---|---|---|---|
| 1 | Mesotrione | 4 lb/Gal | L | 4.0 | fl oz/acre |
| 2 | SA1 | | DF | | |
| 3 | Sedgehammer ® | 60% AW/W | WG | 0.125 | lb ai/acre |
| 4 | Quinclorac | 75% AW/W | DF | 1.0 | lb/acre |
| 5 | Q4 ® | | L | 7 | pt/acre |
| 6 | SA2 | | DF | | |
| 7 | Control | | | | |

MSO (SL applied at 1.5 pt/acre) included with all herbicide treatments.
ai: active ingredient.
SA1 and SA2 indicate treatments with embodiments described herein.
AW/W: weight active ingredient/weight.

Product quantities for the listed treatments and applications are shown in Table 4 (amount based on per area calculations based on spray volume of 20 gal/acre, mix size of 0.5214 L (mix size basis); product amount calculations increased 25% for overage adjustment):

TABLE 4

Listing of Herbicides used in the Three-Component Formulation Study

| Amount | Unit | Herbicide | Form Conc | Form Unit | Form Type |
|---|---|---|---|---|---|
| 0.891 | mL | Mesotrione | 4 | Lb/Gal | L |
| 36.661 | mL | MSO | 100 | % | SL |

TABLE 4-continued

Listing of Herbicides used in the Three-Component Formulation Study

| Amount | Unit | Herbicide | Form Conc | Form Unit | Form Type |
|---|---|---|---|---|---|
| 0.814 | g | Sedgehammer ® | 60 | % AW/W | WG |
| 3.905 | g | Quinclorac | 75 | % AW/W | DF |
| 28.514 | mL | Q4 ® | | | L |
| 14.057 | g | SA2 | | | DF |

An embodiment of a cool season three-component formulation provides an active ingredient load at 1.2 lb rate/acre as follows: 0.78 oz halosulfuron 60% DF, 0.109 lb mesotrione 4 L, and 0.75 lb quinclorac 75% DF.

We claim:

1. A method of controlling at least one weed in turfgrass while reducing or suppressing bleaching of said turfgrass, comprising contacting said turfgrass with an herbicidally effective amount of an herbicide combination consisting of:
    (a) mesotrione and quinclorac, as active ingredients;
    (b) at least one agronomically acceptable excipient; and
    (c) optionally, a third herbicide;
    wherein said quinclorac in said herbicide combination is present in an amount effective to reduce or suppress the phytotoxic or bleaching effect of mesotrione in said turfgrass as compared with the application of mesotrione alone.

2. The method of claim 1, wherein said mesotrione in said composition is applied at about 3 oz/acre to about 4 oz/acre, and wherein said quinclorac is applied at about 0.15 lb/acre to about 1 lb/acre.

3. The method of claim 1, wherein said at least one agronomically acceptable excipient is an adjuvant, a surfactant(s), a crop oil concentrate, a flow agent or an anti-caking agent, an emulsifier, an anti-freeze agent, an anti-foaming agent, a dispersant, a biocide, or a thickener.

4. The method of claim 1, wherein the third herbicide is halosulfuron.

5. The method of claim 4, wherein the halosulfuron is applied in an amount of about 1.1 oz/acre to about 1.3 oz/acre.

6. The method of claim 1, wherein said in said herbicide combination is applied in a spray volume of about 10 gallons/acre to about 20 gallons/acre.

7. The method of claim 1, wherein said turfgrass is Bermuda grass, tall fescue grass, fine fescue grass, buffalograss, perennial ryegrass, or Kentucky bluegrass.

8. The method of claim 1, wherein said at least one weed is a large crabgrass, smooth crab grass, annual bluegrass, green foxtail, barnyard grass, bentgrass, carpetweed, chickweed, purple nutsedge, or yellow nutsedge.

9. The method of claim 1, wherein said herbicide combination controls at least one weed post-emergence, or both pre-emergence and post-emergence.

10. A method of controlling at least one weed in turfgrass while reducing or suppressing bleaching, comprising contacting said turfgrass with a herbicidally effective amount of a three-way herbicidal combination consisting of:
    (a) mesotrione, halosulfuron, and quinclorac as active ingredients, and
    (b) at least one agronomically acceptable excipient,
    wherein said quinclorac in said herbicidal combination is present in an amount effective to reduce or suppress the phytotoxic or bleaching effect of mesotrione on turfgrass as compared with the application of mesotrione alone.

11. The method of claim 10, wherein said active ingredients are present in the herbicidal combination as follows: halosulfuron 60% DF, mesotrione 4 L, and quinclorac 75% DF.

* * * * *